3,679,359
CONTINUOUS MANUFACTURE OF CUPROUS CHLORIDE
Erich Haberland and Werner Perkow, Hamburg, Germany, assignors to Norddeutsche Affinerie, Hamburg, Germany
No Drawing. Filed Mar. 2, 1970, Ser. No. 15,907
Int. Cl. C01g 3/04
U.S. Cl. 23—97                        3 Claims

ABSTRACT OF THE DISCLOSURE

Continuous production of cuprous chloride by reacting metallic, preheated copper with chlorine gas in a melt of cuprous chloride and/or cupric chloride at a temperature between 500 and 700° C. and passing the hot cuprous chloride product through a permeable layer of metallic copper.

PRIOR ART

In the production of cuprous chloride, it is desirable for the product obtained to be dry and very pure. For this purpose it has been proposed to introduce lumps of copper into a reaction vessel containing a melt of cuprous chloride and/or anhydrous cupric chloride at a temperature of 460° C., to introduce chlorine gas from the bottom of the vessel and, at the end of the reaction, to allow the contents of the reaction vessel to stand for half an hour before an upper layer of cuprous chloride is transferred into a copper vessel.

It has also been proposed to perform this reaction in a shaft furnace at 450° to 800° C. According to this latter proposal, the chlorine gas and the copper are introduced into the reaction chamber in quantities at which the chlorine gas is completely consumed by the metallic copper. As an optional step it is also proposed to preheat the copper to elevated temperatures, preferably to 400° C., before it is introduced into the reaction chamber. The reaction product in this process is withdrawn from the bottom of the shaft furnace, possibly through a kind of syphon. In other words, in this process the reaction product and the copper move co-currently.

This previous proposed process does not permit a reaction product to be obtained of a purity substantially exceeding 95 percent. Moreover, the previously proposed processes can either not be performed continuously or if they are performed continuously, reaction vessels of special types are required.

It has now been found that in a process of the above kind cuprous chloride that is 99 percent pure or even purer can be obtained if the reaction product, while still in the liquid state, is passed through a permeable layer of metallic copper.

Accordingly the present invention provides a process for the continuous production of cuprous chloride, wherein metallic copper is reacted with chlorine gas in a melt of cuprous chloride and/or cupric chloride at a temperature between 500 and 700° C., and wherein the reaction product while still in the liquid state is passed through a permeable layer of metallic copper. The layer of metallic copper can consist for instance of granular copper, of a copper filter, copper filings, bundles of copper wire or the like.

This step permits the purity of the cuprous chloride to be further improved irrespective of the manner in which the process is otherwise performed and irrespective of the form of the reaction vessel.

The continuous performance of the process and the reliability with which a product of improved purity can be obtained are further assisted by conducting the copper and the reaction product through the reaction vessel counter-currently. Conveniently this can be done by introducing metallic copper, for instance granular copper, continuously from above into an open-top reaction vessel of any kind, such as a crucible, containing a melt consisting of cuprous chloride and/or cupric chloride and by simultaneously allowing chlorine gas to rise through the melt from the bottom, the reaction product being allowed to run continuously out of the reaction vessel at the top of the crucible particularly at or near the rim, through a permeable layer of copper.

It has been found that in the presence process it is particularly advantageous to keep the surface of the melt substantially free from projecting copper. This can be achieved for instance by continuously maintaining a liquid cuprous chloride layer above the granular copper. A depth of 4 cm. of this layer is quite sufficient.

EXAMPLE

The reaction vessel consisted of a conical graphite fireclay crucible having an internal diameter of 36 cm. at the top and of 30 cm. at the bottom. The thickness of the crucible wall was 2.5 cm. and its height was 50 cm. Disposed 5 cm. above the bottom was a perforated plate made of the same material. Two graphite pipes projected through the plate from above for the introduction therethrough of chlorine gas. The chlorine gas was passed through 5 mm. diameter holes in the perforated plate and uniformly distributed as it entered the reaction chamber filled with the granular copper and a melt of cuprous chloride. The reaction product which was liquid at the existing temperature flowed out through a 5 cm. deep and 4 cm. wide notch in the rim of the crucible and ran through an open graphite spout into a descending copper runner in which the material solidified.

To start with, the crucible was filled with 40 kg. of cuprous chloride and 25 kg. of granular metallic copper. This was heated to a temperature of 600° C., and chlorine gas was then passed through the mixture from below. The temperature of the exothermic reaction could be controlled without supplying external heat by adjusting the velocity of flow of the chlorine gas, and it was thus maintained between about 600 and 650° C. Metallic copper was continuously consumed in the reaction chamber and this was replaced by the introduction from above of granular copper that had been preheated to between 500 and 600° C. The surface of the liquid product remained substantially unbroken by projecting copper.

At the outlet for the reaction product, the melt flowed through a zone of tightly packed pieces of metallic copper, this arrangement being facilitated by slightly tilting the crucible. The product solidified in the runner. It was quickly removed and stored under seal to protect it from moisture and atmospheric oxygen. A consumption of chlorine of 14.3 kg. per hour produced 40 kg. of cuprous chloride per hour containing 99.6 percent of $Cu_2Cl_2$.

We claim:
1. In a process for the continuous production of cuprous chloride wherein metallic copper is reacted with chlorine gas in a melt of a material selected from the group consisting of cuprous chloride and cupric chloride at a temperature between 500 and 700° C. while adding fresh metallic copper feed to the reaction as copper is consumed therein; the improvement comprising passing the copper and the reaction product through the reaction vessel counter-currently and passing the reaction product while in the hot liquid state continuously through a permeable layer of metallic copper, and thereby recovering a cuprous chloride product having a purity exceeding 99 percent.

2. The process of claim 1, wherein a layer of liquid cuprous or cupric chloride is maintained in the reaction vessel sufficient to keep said metallic copper covered.

3. The process of claim 2, wherein fresh metallic copper feed is preheated.

References Cited
UNITED STATES PATENTS

| | | | |
|---|---|---|---|
| 2,367,153 | 1/1945 | Swinehart et al. | 23—97 |
| 1,763,781 | 6/1930 | Heath et al. | 23—97 |
| 2,049,402 | 7/1936 | Wernlund | 23—97 |
| D. 292,472 | 7/1943 | Beck et al. | 23—1 D |
| D. 393,258 | 7/1943 | Beck et al. | 23—1 D |

EDWARD STERN, Primary Examiner

U.S. Cl. X.R.

23—1 D